(12) United States Patent
Hallenstål

(10) Patent No.: US 6,198,729 B1
(45) Date of Patent: Mar. 6, 2001

(54) METHOD AND SYSTEM FOR LOOP PREVENTION IN TELECOMMUNICATIONS

(75) Inventor: Magnus Hallenstål, Täby (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/964,411

(22) Filed: Nov. 4, 1997

(30) Foreign Application Priority Data

Nov. 5, 1996 (SE) .................................................... 9604047

(51) Int. Cl.$^7$ .................................................. H04Q 11/00
(52) U.S. Cl. ......................... 370/261; 379/202; 379/207
(58) Field of Search .................................. 370/260, 261, 370/264, 269, 262; 379/202, 204, 205, 206, 207, 203

(56) References Cited

U.S. PATENT DOCUMENTS

| | | | |
|---|---|---|---|
| 4,920,565 | * 4/1990 | Strawczynski et al. | 379/202 |
| 4,998,243 | * 3/1991 | Kao | 379/202 |
| 5,195,086 | * 3/1993 | Baumgartner et al. | 379/202 |
| 5,583,925 | * 12/1996 | Bernstein | 379/202 |
| 5,883,947 | * 3/1999 | Nakamura | 379/202 |

FOREIGN PATENT DOCUMENTS 0 428 448   5/1991   (EP) ................................ H04M/3/54

OTHER PUBLICATIONS

Raneri, Giovanni, "ITU Report Com 11–4 141–E", Telecom Italy, Jul. 17, 1995.

Patent Abstracts of Japan, Abstract of JP A 2–25147 (Fujitsu Ltd), Jan. 26, 1990.

* cited by examiner

Primary Examiner—Ricky Ngo
(74) Attorney, Agent, or Firm—Burns, Doane, Swecker & Mathis, L.L.P.

(57) ABSTRACT

The present invention relates to a method for telecommunications and a device for that method. A first time slot is assigned for a first channel (2) between a first local exchange (LEA) to which a first subscriber (A) is connected or is being connected, and a second local exchange (LEB) to which a second subscriber (B) is connected or is being connected. A second time slot is assigned for a second channel (4) between the first local exchange (LEA) and a third local exchange (LEC) to which a third subscriber (C) is connected or is being connected. The first subscriber (A) makes a request that the second subscriber (B) and the third subscriber (C) shall continue to be or shall become connected, while the first subscriber (A) is disconnected. According to the invention, a transmitter (16) sends at least one tone in one of the time slots, a timer (17) is started and a receiver (15) listens in the other time slot. If the receiver (15) has not detected the tone before the timer (17) has elapsed, the request is executed.

7 Claims, 5 Drawing Sheets

METHOD AND SYSTEM FOR LOOP PREVENTION IN TELECOMMUNICATIONS

TECHNICAL FIELD

The present invention relates to a method and a device providing an explicit call transport service (ECT) or similar, in telecommunication.

STATE OF THE ART

According to conventional digital telecommunication system technology several speech channels share the same physical link. The sound in each channel is sampled and the channels are time-multiplexed by division of the time into a number of time slots. In each time slot a sample from one channel is then valid.

In a 32-channel telecommunication system 32 time slots are used in a frame in which the first sample from each channel are transmitted in sequence. The frame is repeated in time so that the second, third etc. sample from each channel can be transmitted. The time slots are usually denoted TS0 to TS31.

One way of sending signalling over a telecommunication system is using a channel, e.g. sent in TS16, for common signalling for many channels. Such a signalling system is the Common Channel Signalling System Number 7 (CCS7), which comprises a Message Transfer Part (MTP) and user parts (UP). The user parts can, for instance, be Telephony User Part (TUP) or ISDN User Part (ISUP).

The ITU-report COM 11-R 141-E discusses the problem of loops in telecommunication networks. Loops are something which can arise when explicit call transfer (ECT) is executed. ECT means that a subscriber involved in two calls, which can be incoming or outgoing, disconnects himself while the two other subscribers are still connected. If several involved subscribers do this, a loop can arise which nobody can control.

This is solved in the report by using a special Loop Prevention message (LOP) sent by means of ISUP. When the local exchange belonging to the subscriber involved in two calls gets the request for ECT, it sends a Loop Prevention Request each to the two local exchanges belonging to the other two subscribers and starts a timer. If at least one of the local exchanges gives back a Loop Prevention Response: "No loop exists", ECT is allowed and executed. If the Loop Prevention Request comes back unchanged or with "simultaneous transfer", ECT is not executed. If the timer elapses without any response at all coming back or if Loop Prevention Response comes back with "insufficient information", it is selectable if ECT is to be executed or not.

DESCRIPTION OF THE INVENTION

The problem with the previous solution is that it works only if modem ISUP-signalling is used everywhere in the telephone network. If older types of ISUP or any other type of signalling, such as Telephony User Part (TUP) or Channel Associated Signalling (CAS), are used somewhere, the LOP-message will disappear along the way.

The object of the present invention is to solve this problem by sending a short faint tone or a pattern of tones through one of the set up speech channels and starting a timer at the request of ECT instead of signalling over a signalling channel. If the tone returns in the other speech channel before the timer has elapsed, then there is a loop, and ECT will therefore not be executed. If the tone does not return, there is no loop and ECT will be executed as usual.

The advantage of the present invention is that it always works regardless of which signalling systems are used in the telephone network.

The invention will now be further described, using preferred embodiments and with reference to the annexed drawings.

The connections in the figures are to be schematically interpreted. The connections can actually be long-distance in the telephone network via several different exchanges.

PREFERRED EMBODIMENTS

In order to better understand the invention, the Explicit Call Transfer service (ECT) will first be explained and the problem involved in this.

Figure 1A:
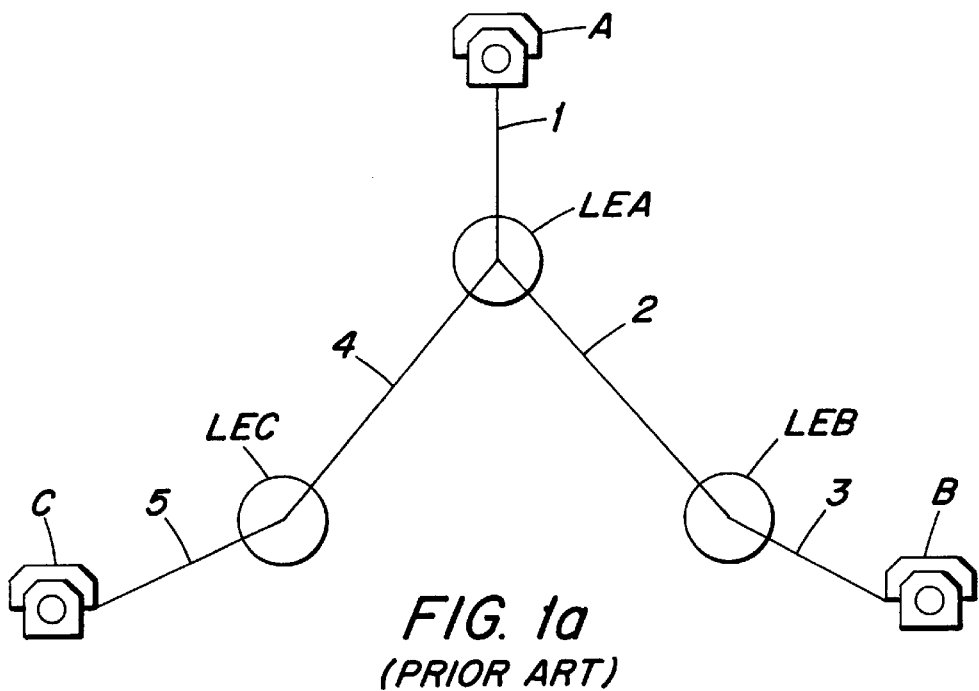
FIGS. 1a–b show block diagrams of the known explicit call transfer function.
Figure 1B:
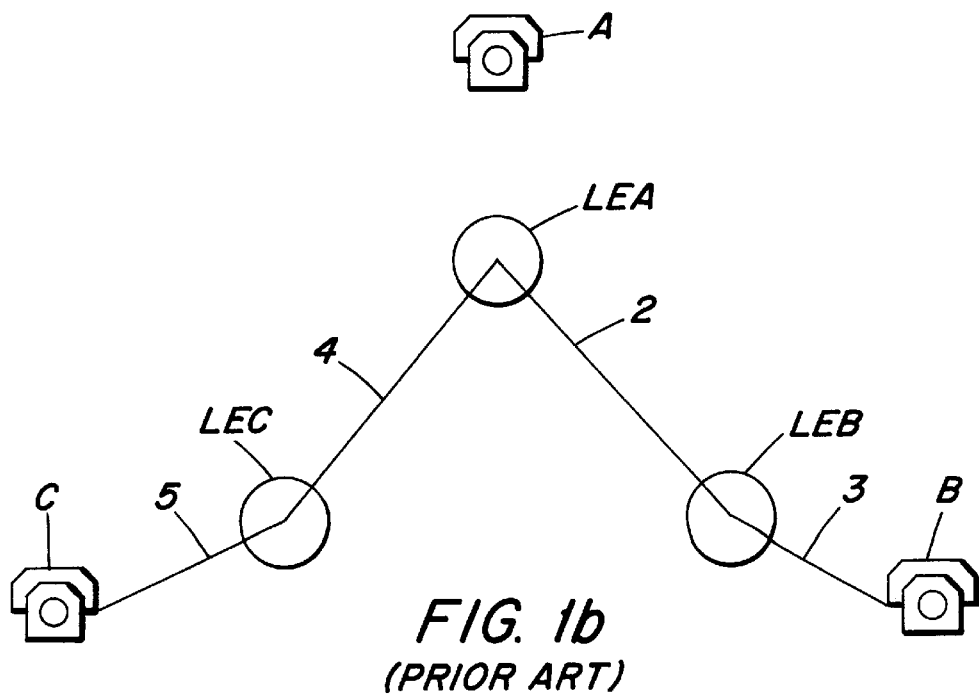

In FIGS. 1a and 1b the explicit call transfer service according to prior art is shown. In FIG. 1a a three-party conference is initiated by a first subscriber A. A channel 1 is first set up between the first subscriber A and a first local exchange LEA. From the first local exchange LEA a channel 2 is set up to a second local exchange LEB and from there a channel 3 is set up to a second subscriber B. In the same way a channel 4 is set up from the first local exchange LEA to a third local exchange LEC and from there, a channel 5 is set up to a third subscriber C. Now all three subscribers A, B and C can talk to each other at the same time.

In FIG. 1b the three-party initiating first subscriber A does not want to take part in the call any longer and he therefore executes explicit call transfer, i.e. he disconnects himself by disconnecting the channel 1 to the first local exchange LEA, while the other two subscribers B and C are still connected and can talk to each other.

Figure 2A:
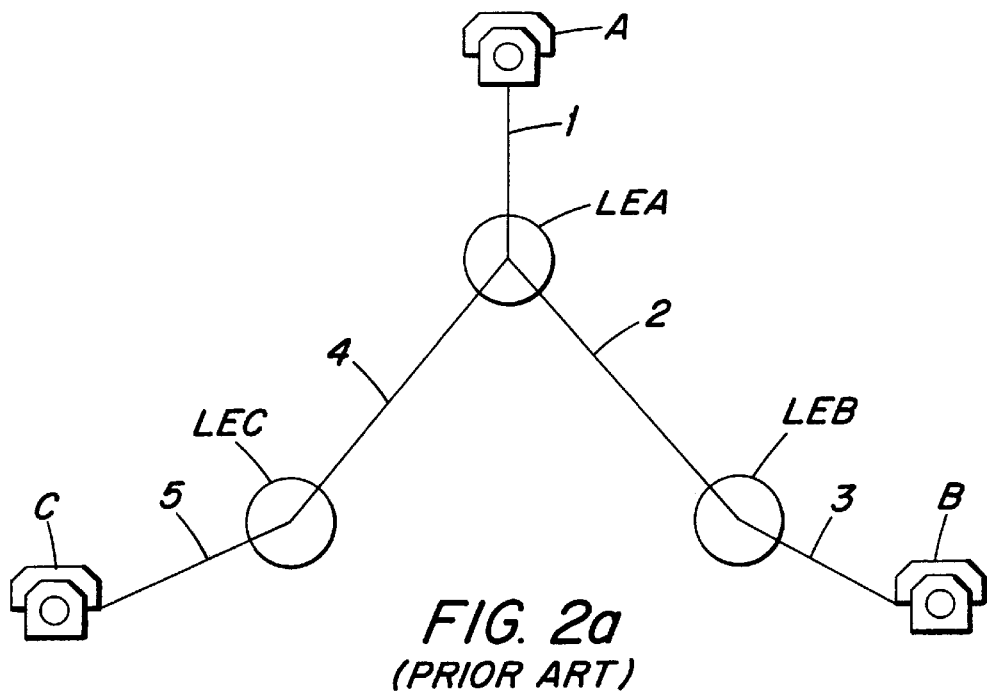
FIGS. 2a–f show block diagrams of a known problem which can arise in explicit call transfer.

In FIGS. 2a–f a problem is shown that can arise when using explicit call transfer. FIG. 2a is identical to FIG. 1a: A three-party conference is initiated by a first subscriber A. First a channel 1 is set up between the first subscriber A and a first local exchange LEA. From the first local exchange LEA a channel 2 is set up to a second local exchange LEB, and from there a channel 3 is set up to a second subscriber B. In the same way, a channel 4 is set up from the first local exchange LEA to a third local exchange LEC, and from there a channel 5 is set up to a third subscriber C. Now all three subscribers A, B and C can talk to each other at the same time.

Figure 2B:
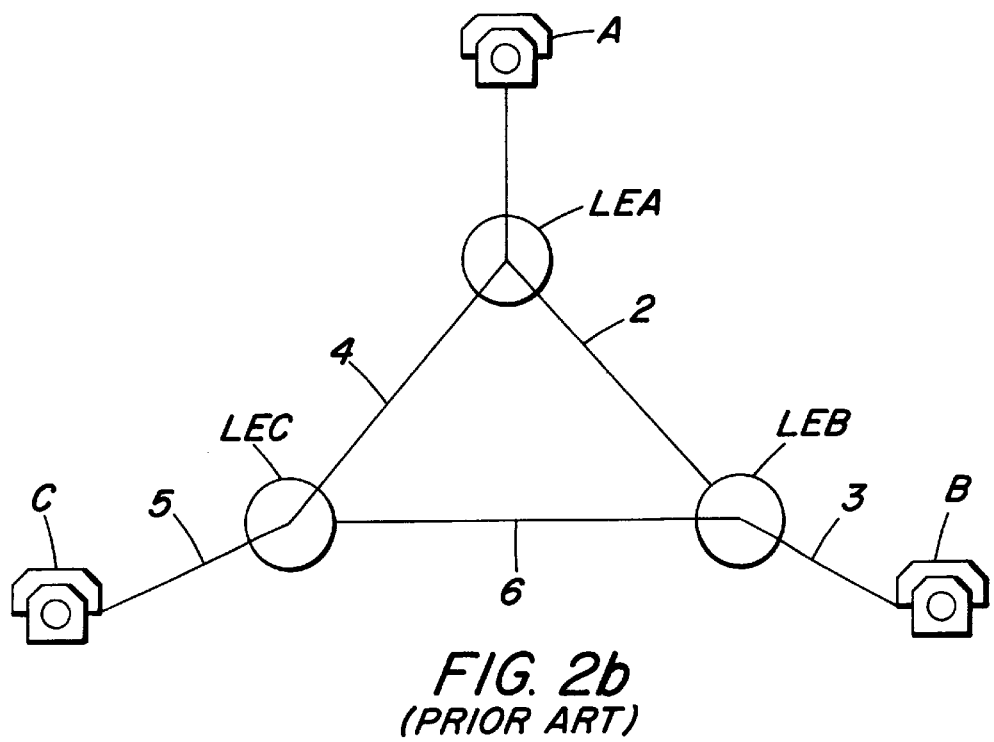

In FIG. 2b the second subscriber B puts the first subscriber A on hold and calls the third subscriber C, which gives a channel 6 between the second local exchange LEB and the third local exchange LEC.

Figure 2C:
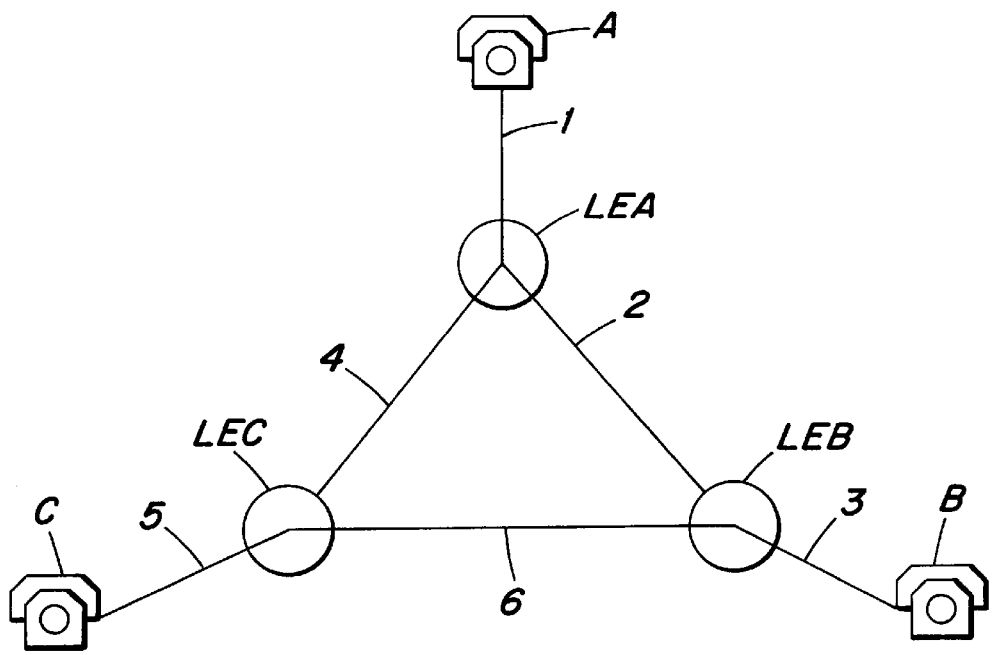

In FIG. 2c the third subscriber C puts the first subscriber A on hold and answers the second subscriber B.

Figure 2D:
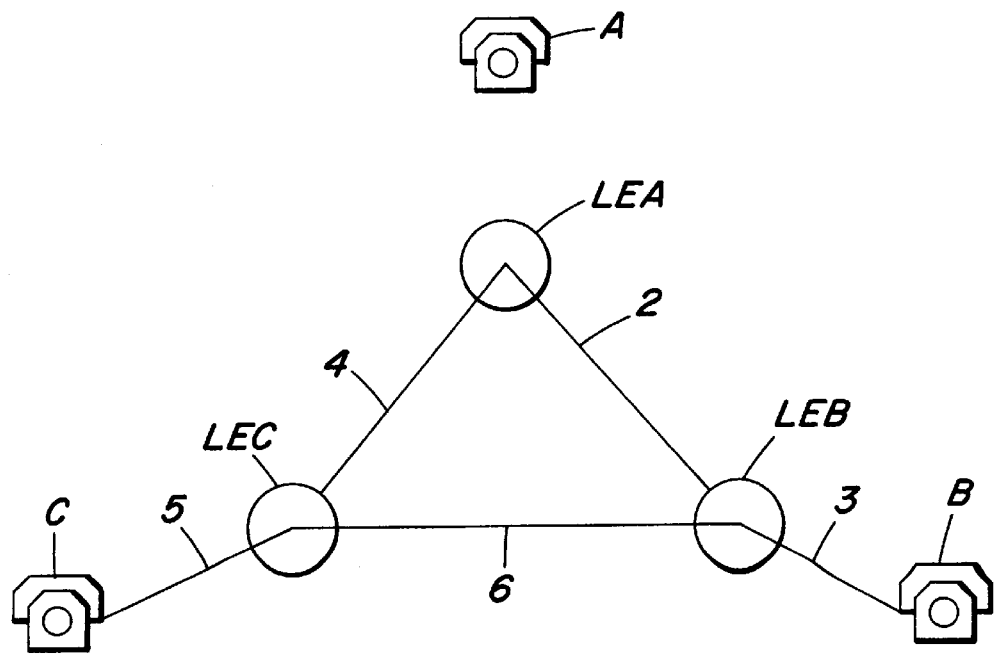

In FIG. 2d the first subscriber A executes explicit call transfer, i.e. the channel 1 to the first local exchange LEA is disconnected. Note that there is now both a connection from the second local exchange LEB to the third local exchange LEC via the first local exchange LEA, said connection being idle, and a connection from the second subscriber B to the third subscriber C via the second local exchange LEB and the third local exchange LEC.

Figure 2E:
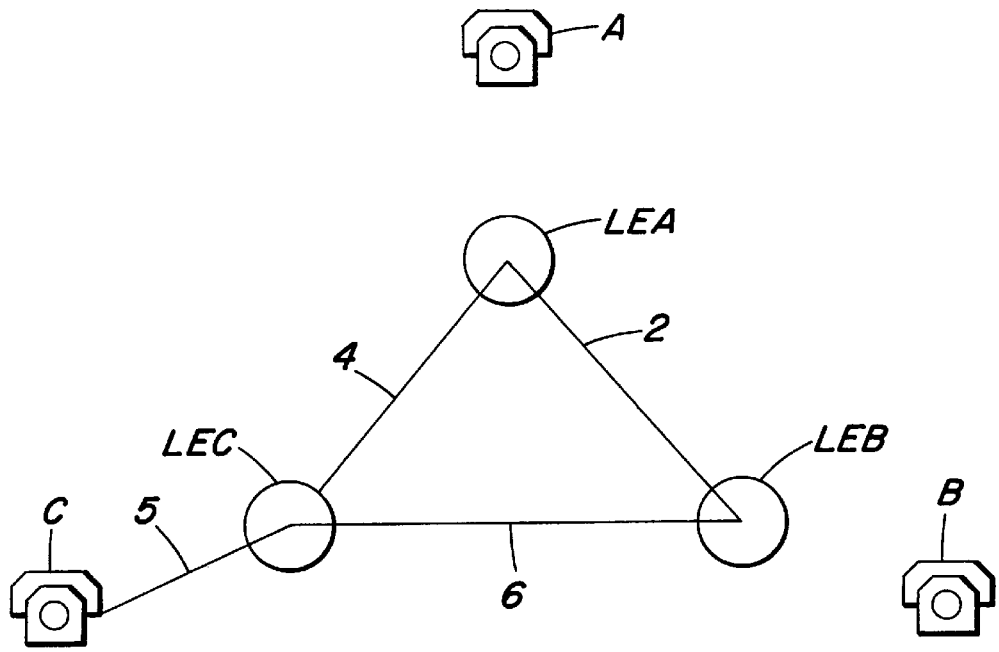

In FIG. 2e the second subscriber B also executes explicit call transfer, i.e. the channel 3 to the second local exchange LEB is disconnected.

Figure 2F:
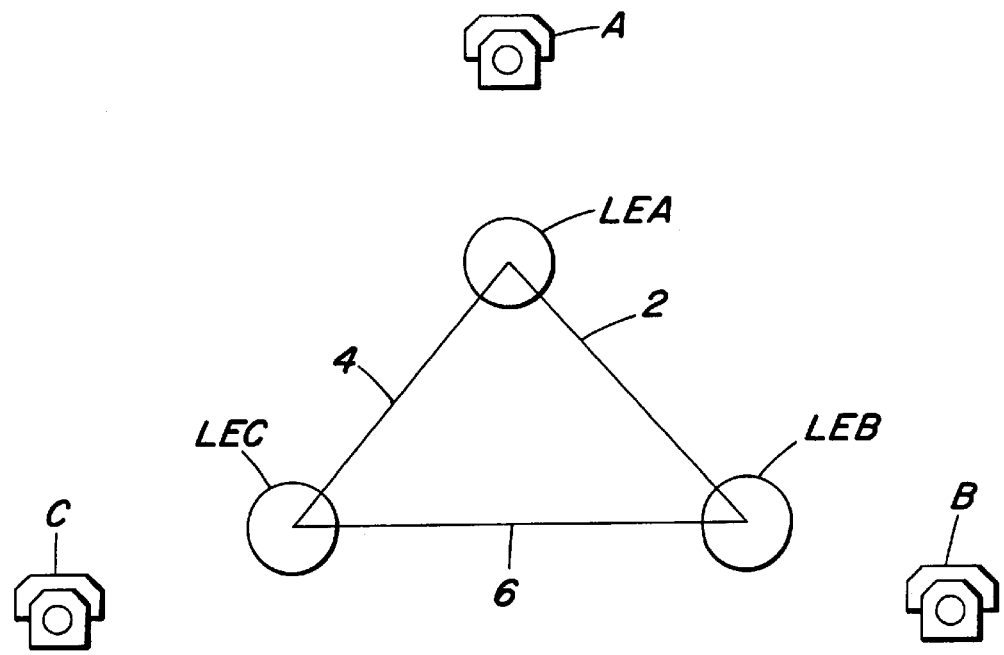

In FIG. 2f the third subscriber C finally executes explicit call transfer, i.e. the channel 5 to the third local exchange LEC is disconnected. Now something strange has happened; a loop, which nobody can control, has formed between the three local exchanges LEA, LEB and LEC.

The loop can also form in other ways. Each time a subscriber is involved in at least two calls and executes explicit call transfer or similar there is an element of risk that the problem occurs. The subscriber needs not to have initiated all the calls himself.

Figure 3:
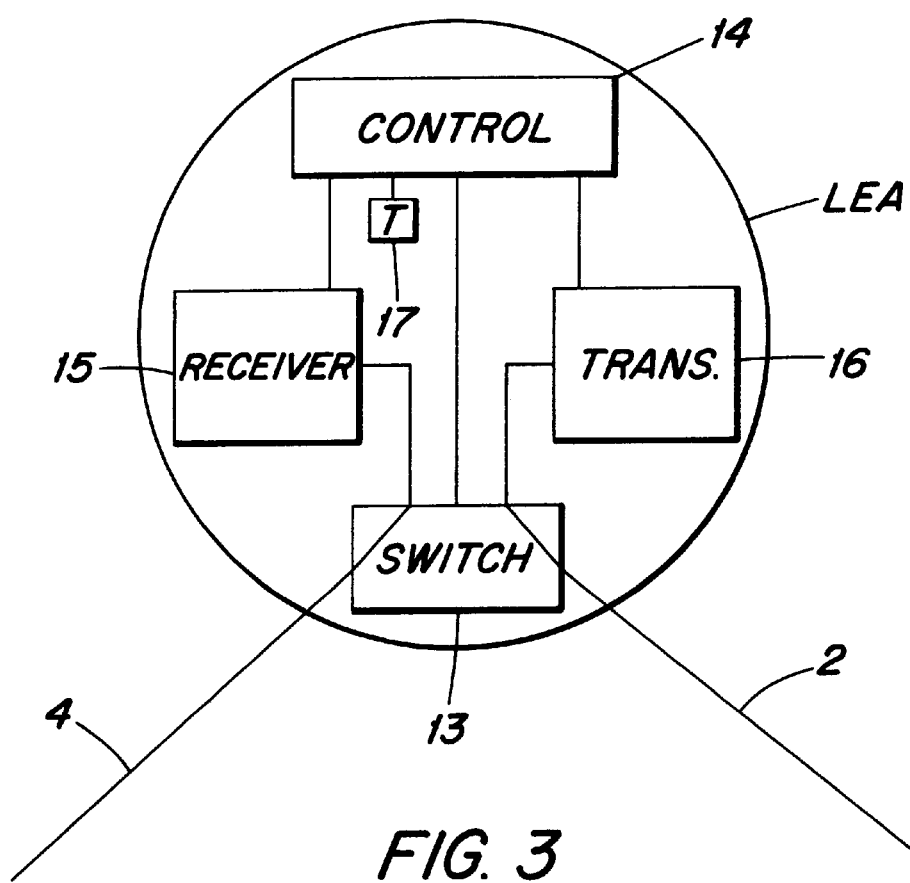
FIG. 3 shows a block diagram according to the invention.

In FIG. 3 it is shown how the problem is solved according to the present invention. A subscriber connected to a local exchange LEA is involved in two calls via a first speech channel 2 and a second speech channel 4, cf. FIG. 1. The subscriber now wants to execute ECT. Therefore a check should be made so that a loop does not form as described above.

Instead of, as in prior art, signalling in a common time slot and risking to lose the signals along the way, the invention uses the set up speech channels 2 and 4. The local exchange comprises a switch 13 from which the two speech channels 2 and 4 emanate, a control means 14, a transmitter 16, a receiver 15 and a timer 17.

No advanced signalling is needed. The invention stems from the knowledge that if there is a risk of a loop forming when performing ECT, the first speech channel 2 will already in some way be connected to the second speech channel 4 outside the local exchange LEA. This is most easily checked by the control means 14 initiating the transmitter 16 to send, via the switch 13, for example a short, faint tone on the first speech channel 2, and starting a timer 17.

If the first speech channel 2 in some way is connected with the second speech channel 4, the sent tone will return to the local exchange LEA via the second speech channel 4 and can there be detected via the switch 13 by the receiver 15. On detection the timer 17 is stopped and the control means 14 indicates that ECT cannot be per-formed. The subscriber is preferably informed of this via a voice message like "Explicit call transfer cannot be performed".

The tone sent should not be too strong because the connected subscribers can then be disturbed. The tone is sent on the speech channels and is therefore audible. The tone need naturally neither be too faint; it has to be possible to detect. When the tone is detected, attention must also be paid to the possible reflections and such in the telephone network which can change the tone.

Naturally, it needs not only be one tone; it could be a pattern of several tones which are of different length and of different pitch or the like. This would be to simplify identification when the tonal pattern returns.

If, after a certain predetermined time, no tone/no tonal pattern has been detected, it is certain that no loop is likely to form; ECT is thus allowed and ECT is performed as desired.

The invention can also be applied in other similar contexts when a subscriber is involved in at least two calls, incoming or outgoing. It can also concern data communication and similar.

What is claimed is:

1. A telecommunication system comprising:
   a first speech channel for connecting a first local exchange to a second local exchange;
   a second speech channel for connecting said first local exchange to a third local exchange;
   means for generating a request that a second subscriber, associated with said second local exchange, and a third subscriber, associated with said third local exchange, are interconnected via said first and second channels while a first subscriber, associated with said first local exchange, is disconnected;
   a transmitter, associated with said first local exchange, for transmitting a tone on said first speech channel when said request is generated; and
   a receiver, associated with said first local exchange, for listening for said tone on said second speech channel.

2. The telecommunication system of claim 1, further comprising:
   a timer which is started when said tone is transmitted on said first speech channel, wherein said request is executed if said timer expires and said receiver has not received said tone on said second speech channel.

3. The telecommunication system of claim 1, wherein at least one of said first and second speech channels include at least one timeslot.

4. A method for loop prevention in a telecommunication system comprising the steps of:
   connecting a first local exchange to a second local exchange using a first speech channel;
   connecting said first local exchange to a third local exchange using a second speech channel;
   generating a request that a second subscriber, associated with said second local exchange, and a third subscriber, associated with said third local exchange, are interconnected via said first and second channels while a first subscriber, associated with said first local exchange, is disconnected;
   transmitting a tone on said first speech channel when said request is generated; and
   listening for said tone on said second speech channel.

5. The method of claim 4, further comprising the step of:
   starting a timer said tone is transmitted on said first speech channel, wherein said request is executed if said timer expires and said receiver has not received said tone on said second speech channel.

6. The method of claim 4, further comprising the step of:
   transmitting a voice message to a first subscriber associated with said first local exchange if said tone is detected on said second speech channel.

7. The method of claim 4, wherein said tone is a pattern of tones.

* * * * *